(12) United States Patent
Fujioka

(10) Patent No.: US 9,766,758 B2
(45) Date of Patent: Sep. 19, 2017

(54) OPERATION DEVICE

(71) Applicant: KABUSHIKI KAISHA TOKAI RIKA DENKI SEISAKUSHO, Aichi (JP)

(72) Inventor: Yasuhiro Fujioka, Aichi (JP)

(73) Assignee: KABUSHIKI KAISHA TOKAI RIKA DENKI SEISAKUSHO, Aichi (JP)

( * ) Notice: Subject to any disclaimer, the term of this patent is extended or adjusted under 35 U.S.C. 154(b) by 0 days.

(21) Appl. No.: 14/533,175

(22) Filed: Nov. 5, 2014

(65) Prior Publication Data

US 2015/0123941 A1   May 7, 2015

(30) Foreign Application Priority Data

Nov. 7, 2013   (JP) .................................. 2013-230867

(51) Int. Cl.
  *G06F 3/044*   (2006.01)
  *G06F 3/041*   (2006.01)
(52) U.S. Cl.
  CPC ............ *G06F 3/044* (2013.01); *G06F 3/0416* (2013.01)
(58) Field of Classification Search
  CPC ............................... G06F 3/0416; G06F 3/044
  USPC ......................................... 345/156, 170–176
  See application file for complete search history.

(56) References Cited

U.S. PATENT DOCUMENTS

2002/0039092 A1*  4/2002  Shigetaka ............... G06F 3/044
                                                              345/156
2010/0225604 A1*  9/2010  Homma ................. G06F 3/0414
                                                              345/173
2011/0050618 A1   3/2011  Murphy et al.
2011/0310045 A1   12/2011 Toda et al.
2012/0092296 A1   4/2012  Yanase et al.
2013/0234987 A1   9/2013  Ye et al.
(Continued)

FOREIGN PATENT DOCUMENTS

JP     2010-204811     9/2010
JP     2010-204812     9/2010
(Continued)

OTHER PUBLICATIONS

Office Action Japanese Application No. 2013-230867 dated Nov. 4, 2014 and English translation of the reasons for rejection.
(Continued)

*Primary Examiner* — Tony Davis
(74) *Attorney, Agent, or Firm* — Roberts Mlotkowski Safran Cole & Calderon PC

(57) ABSTRACT

An operation device includes a detecting portion that detects an operation performed on an operation surface and outputs a detection value, and a computing portion that includes a first threshold for determining whether or not an operation is performed on the operation surface and a second threshold more than the first threshold, and operates such that a detection point calculated based on a second detection value acquired from the detecting portion is replaced by a detection point calculated based on a first detection value acquired from the detecting portion when the second detection value is a value between the first and second thresholds, the first detection value being more than the second threshold and being acquired before the second detection value.

8 Claims, 5 Drawing Sheets

(56) References Cited

U.S. PATENT DOCUMENTS

| | | | | |
|---|---|---|---|---|
| 2013/0307828 A1* | 11/2013 | Miller | ............ | G06F 3/0414 345/177 |
| 2014/0160038 A1* | 6/2014 | Lee | ............ | G06F 3/044 345/173 |
| 2014/0362016 A1* | 12/2014 | Matsuki | ............ | G06F 3/041 345/173 |
| 2015/0160774 A1* | 6/2015 | Zhai | ............ | G06F 3/0416 345/173 |

FOREIGN PATENT DOCUMENTS

| | | |
|---|---|---|
| JP | 2010-211399 | 9/2010 |
| TW | 526445 B | 4/2003 |

OTHER PUBLICATIONS

European Search Report issued in corresponding application EP14190821.0 dated May 11, 2015.
Office Action issued in corresponding Chinese application No. 201410602552.X dated Mar. 17, 2017.
Chinese Patent Application No. 201410602552.X Office Action, dated Jul. 4, 2017 and English translation thereof.

\* cited by examiner

S4 IS DETECTION VALUE BETWEEN FIRST THRESHOLD AND SECOND THRESHOLD?
S5 OUTPUT OPERATION INFORMATION CONTAINING DETECTION POINT OF PREVIOUS CYCLE AS DETECTION POINT OF CURRENT CYCLE

18 COMMUNICATION SECTION  200 FIRST THRESHOLD  201 SECOND THRESHOLD
202 ACCUMULATED INFORMATION  203 MULTIPLICATION INFORMATION  S1 DRIVE CONTROL SIGNAL
S3 CAPACITANCE  S6 OPERATION INFORMATION

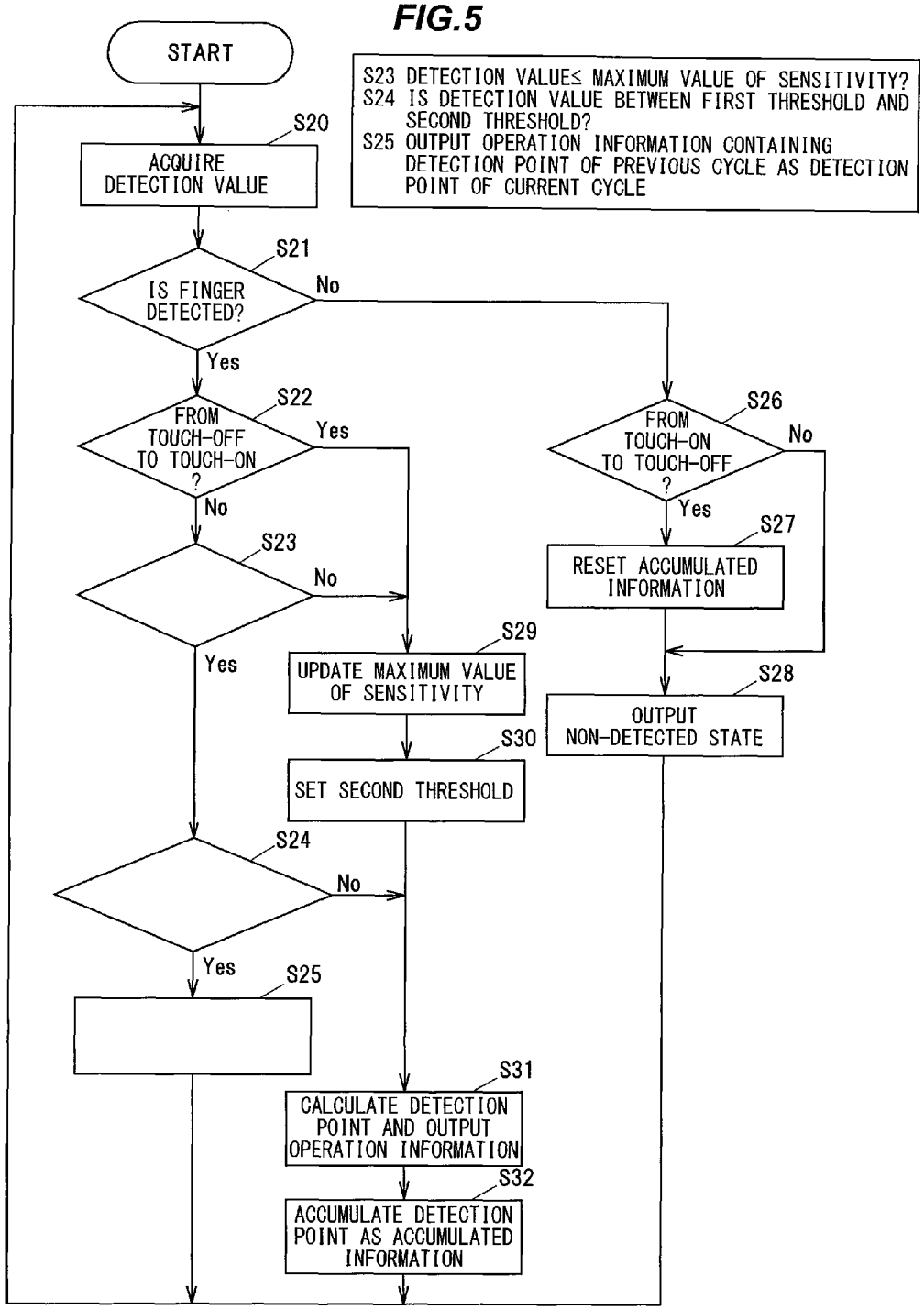

OPERATION DEVICE

The present application is based on Japanese patent application No. 2013-230867 filed on Nov. 7, 2013, the entire contents of which are incorporated herein by reference.

BACKGROUND OF THE INVENTION

1. Field of the Invention

The invention relates to an operation device.

2. Description of the Related Art

A mobile terminal device is known that includes a detection unit for detecting a touch region on a touchpad, a tip coordinate calculation unit for calculating the coordinates of the tip of the touch region, a center coordinate calculation unit for calculating the coordinates of the center of the touch region, a determination unit for determining whether or not the touch region travels, a travel distance calculation unit for calculating a travel distance by using either the coordinates of the tip or the coordinates of the center on the basis of a determination result of the determination unit, and a coordinate output unit for outputting the indicated coordinates indicating a specific position corresponding to the touch operation on the touchpad by using the calculated travel distance (see, e.g., JP-A-2010-204811).

The mobile terminal device operate such that the travel distance is calculated based on the coordinates of the tip during traveling of the contact region and is calculated based on the coordinates of the center when the contact region stops, moves away and starts touching. Therefore, the mobile terminal device can output the travel distance corresponding to the movement intended by a user during traveling as well as stoppage of a finger.

SUMMARY OF THE INVENTION

The mobile terminal device may cause a problem that, even though a finger simply moves away from the touchpad, the movement of the coordinates of the center is calculated depending on how the finger moves away and this causes the unintentional movement of an operated object such as a cursor, resulting in deterioration of operability.

It is an object of the invention to provide an operation device that prevents the unintentional movement of the operated object to improve the operability.

According to one embodiment of the invention, an operation device comprises:

a detecting portion that detects an operation performed on an operation surface and outputs a detection value; and a computing portion that comprises a first threshold for determining whether or not an operation is performed on the operation surface and a second threshold more than the first threshold, and operates such that a detection point calculated based on a second detection value acquired from the detecting portion is replaced by a detection point calculated based on a first detection value acquired from the detecting portion when the second detection value is a value between the first and second thresholds, the first detection value being more than the second threshold and being acquired before the second detection value.

According to one embodiment of the invention, an operation device can be provided that prevents the unintentional movement of the operated object to improve the operability.

BRIEF DESCRIPTION OF THE DRAWINGS

Next, the present invention will be explained in more detail in conjunction with appended drawings, wherein:

FIG. 5 is a flowchart showing an operation of the operation device in the second embodiment.

DETAILED DESCRIPTION OF THE PREFERRED EMBODIMENTS

Summary of the Embodiments

Operation devices of the embodiments are generally comprised of a detecting portion to detect an operation performed on an operation surface and outputs a detection value, and a computing portion to store a first threshold for determining whether or not an operation is performed on the operation surface and a second threshold more than the first threshold, and operates such that a detection point calculated based on a second detection value acquired from the detecting portion is replaced by a detection point calculated based on a first detection value acquired from the detecting portion when the second detection value is a value between the first and second thresholds, the first detection value being more than the second threshold and being acquired before the second detection value.

When the obtained second detection value is between the first and second thresholds, the operation device cancels movement from a detection point based on the previously-calculated first detection value, i.e., cancels movement of an operated object. Therefore, movement, etc., of an operated object which is not intended by an operator is suppressed and it is thus possible to improve operability as compared to the case where calculation of the detection point is performed based on a threshold for determining whether or not an operation is performed. Here, the movement, etc., of an operated object includes, e.g., a change in position of a cursor, deselection of the selected icon and a change in drag or drop position, etc.

First Embodiment

Configuration of Operation Device 1

Figure 1A:
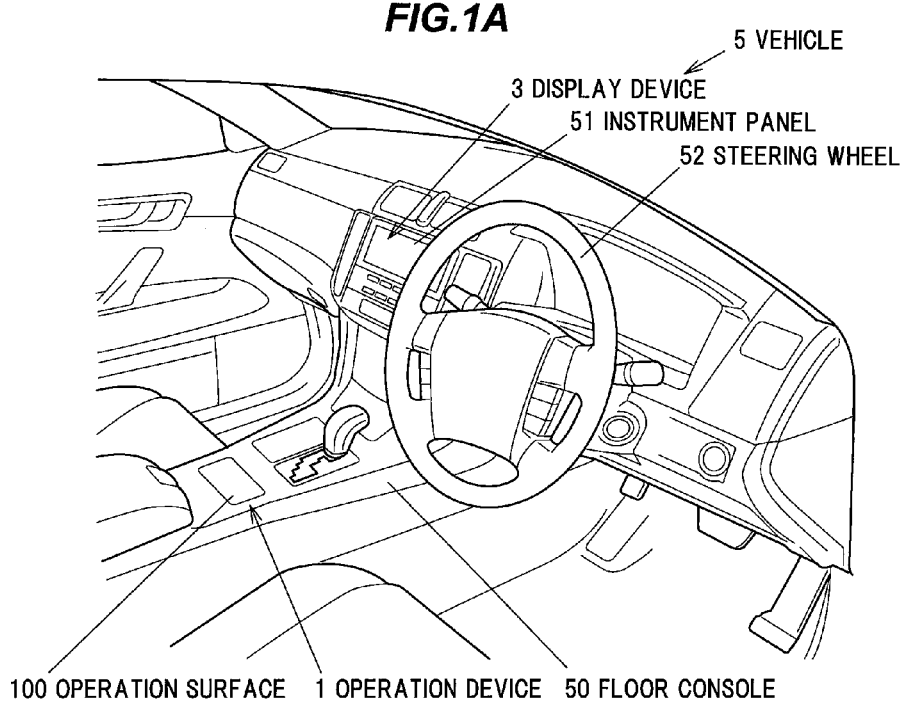
FIG. 1A is a schematic view showing the inside of a vehicle mounting an operation device in a first embodiment.
Figure 1B:
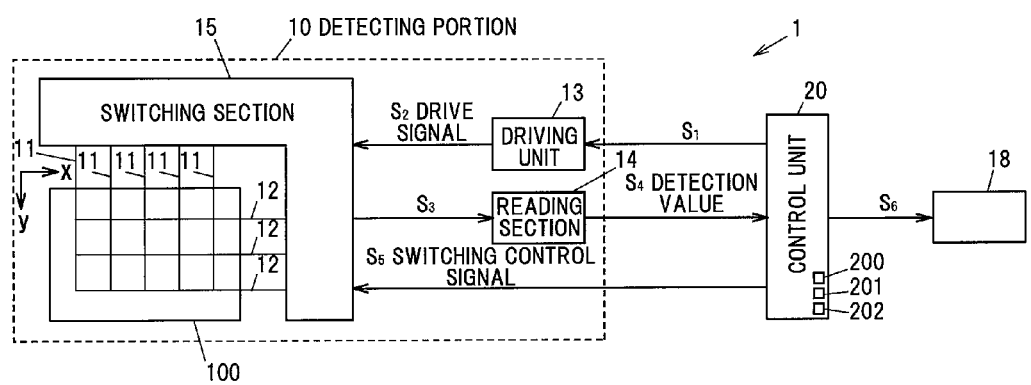
FIG. 1B is a block diagram illustrating the operation device of the first embodiment.
Figure 2A:
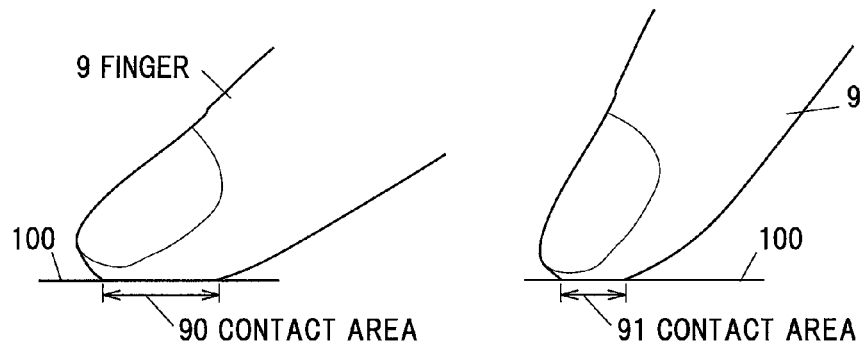
FIG. 2A is a schematic view for explaining an operation performed on an operation surface of the operation device in the first embodiment.
Figure 2B:
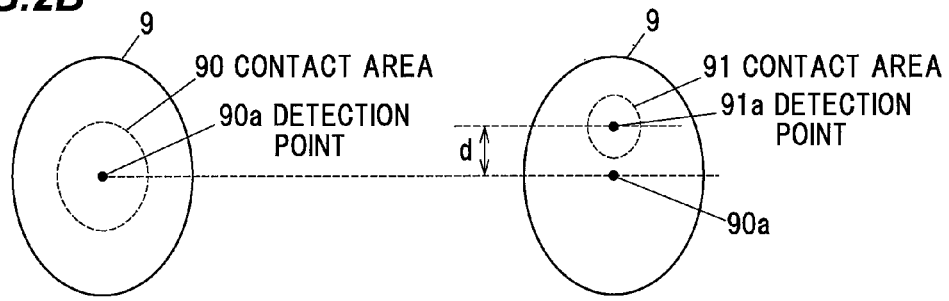
FIG. 2B is a schematic view of a contact area of a finger touching the operation surface.
Figure 2C:
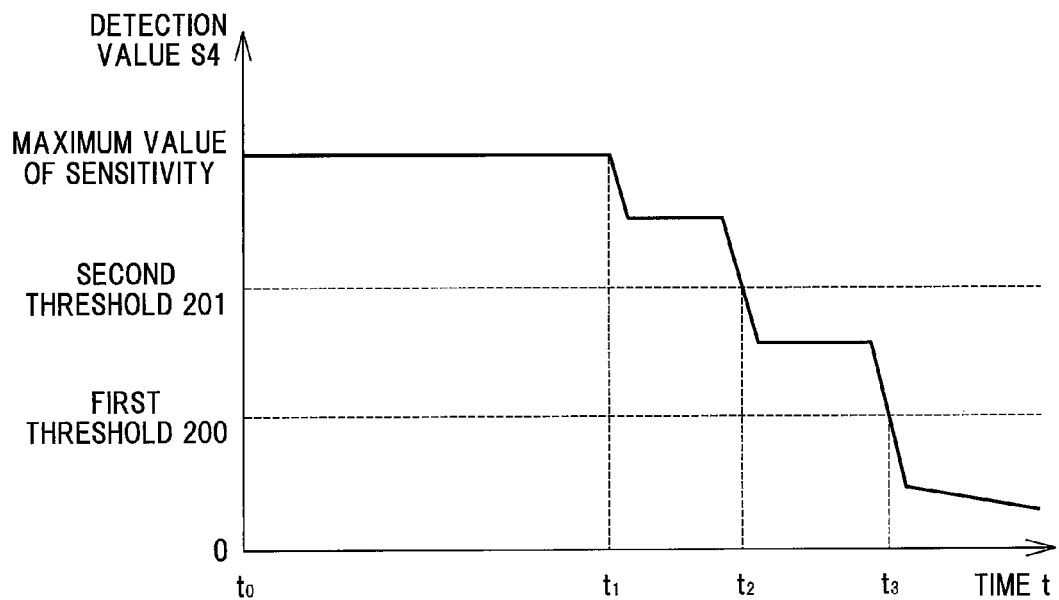
FIG. 2C is a graph showing variation in detection value over time in the first embodiment.

FIG. 1A is a schematic view showing the inside of a vehicle mounting an operation device in the first embodiment and FIG. 1B is a block diagram illustrating the operation device. FIG. 2A is a schematic view for explaining an operation performed on an operation surface of the operation device in the first embodiment, FIG. 2B is a schematic view of a contact area of a finger touching the operation surface and FIG. 2C is a graph showing variation in detection value over time. In FIG. 2C, the vertical axis is a detection value $S_4$ and the horizontal axis is time t. In addition, the maximum value of sensitivity shown in FIG. 2C indicates the maximum value of the detection value $S_4$. In each drawing of the embodiments described below, a proportion of component may be different from an actual proportion.

An operation device 1 is capable of operating, e.g., an electronic device electromagnetically connected thereto. The operation device 1 is configured to allow an operation by, e.g., a portion of the body of an operator (e.g., a finger) or a special pen to move or select a cursor displayed on a display portion of the electronic device or to give instructions such as selecting, assigning, dragging or dropping the displayed icon. In the embodiments, an operation performed by a finger will be described.

Here, electromagnetic connection mentioned above is connection using at least one of a conductive material, light as a kind of electromagnetic wave and radio wave as a kind of electromagnetic wave.

The operation device 1 is arranged on, e.g., a floor console 50 located between a driver's seat and a front passenger seat, as shown in FIG. 1A. The position to arrange the operation device 1 is not limited to the floor console 50 and can be an arbitrary place, and the operation device 1 may be arranged at a position overlapping a display device 3 or may be arrange on a steering wheel 52.

The electronic device connected to the operation device 1 is, e.g., a navigation system which displays a destination and a current location together with a map, an air conditioner for adjusting temperature inside a vehicle 5, or a playback system for playing back music or video images recorded in a recording medium. The electronic device is configured to display, e.g., a menu or a map, etc., on the display device 3 arranged on an instrument panel 51, as shown in FIG. 1A.

As shown in FIG. 1B, the operation device 1 is generally composed of a detecting portion 10 which detects an operation performed on an operation surface 100 and outputs the detection value $S_4$, and a control unit 20 as a computing portion which has a first threshold 200 for determining whether or not an operation is performed on the operation surface 100 and a second threshold 201 larger than the first threshold 200 and controls so that a detection point calculated based on a first detection value acquired from the detecting portion 10 is used as a detection point for a second detection value also acquired from the detecting portion 10 when the second detection value is a value between the first threshold 200 and the second threshold 201. The first detection value is larger than the second threshold and is acquired before the second detection value.

The operation device 1 is also provided with a communication section 18 which communicates with the electronic device and outputs below-described operation information $S_6$ to the electronic device, as shown in FIG. 1B.

Configuration of Detecting Portion 10

The detecting portion 10 is, e.g., a touch sensor which detects a position on the operation surface 100 in contact with, i.e., touched by, a finger of an operator. The operator can operate the electronic device by performing an operation on, e.g., the operation surface 100. In detail, the detecting portion 10 is, e.g., a capacitive touch sensor detecting variation in current which is caused by an approach or contact of the finger to the operation surface 100 and is inversely proportional to a distance between below-described sensor electrodes and the finger.

The detecting portion 10 is composed of, e.g., plural sensor electrodes 11, plural sensor electrodes 12, a driving unit 13, a reading section 14 and a switching section 15, as shown in FIG. 1B.

In the detecting portion 10, the plural sensor electrodes 11 aligned parallel to the y-axis at equal intervals and the plural sensor electrodes 12 aligned parallel to the x-axis at equal intervals are insulated from each other and are arranged under the operation surface 100. The x-axis direction is a horizontal direction on the paper plane of FIG. 1B and the y-axis direction is a vertical direction on the paper plane. An origin of this x-y coordinate system is the top left of the operation surface 100 in FIG. 1B. Five sensor electrodes 11 and three sensor electrodes 12 are schematically illustrated in FIG. 1B only for the purpose of explanation and the numbers thereof are different from the actual numbers.

The sensor electrodes 11 and 12 are formed of, e.g., a conductive metal material. The conductive metal material is a material which contains a metal, e.g., copper or silver, etc. The sensor electrodes 11 and the sensor electrodes 12 are electrode patterns formed by connecting, e.g., plural rectangular electrodes via wirings.

The sensor electrodes 11 and 12 are electrically connected to the switching section 15, as shown in FIG. 1B.

The driving unit 13 is electrically connected to the control unit 20. The driving unit 13 is configured to generate a drive signal $S_2$ based on a drive control signal $S_1$ output from the control unit 20 and then to supply the drive signal $S_2$ to the sensor electrodes 11 via the switching section 15.

The reading section 14 is electrically connected to the control unit 20. The reading section 14 is configured to read out capacitance $S_3$ from the sensor electrodes 12 connected thereto via the switching section 15. As an example, the reading section 14 is configured to output the detection value $S_4$, which is produced by a filtering process, etc., of the read-out capacitance $S_3$, to the control unit 20. Alternatively, the detecting portion 10 may be configured such that the switching section 15 is electrically connected to the control unit 20 and the capacitance $S_3$ is input as the detection value $S_4$ to the control unit 20.

The switching section 15 is, e.g., a multiplexer electrically connected to the control unit 20. The switching section 15 is configured to switch from electrical connection between the driving unit 13 and the sensor electrodes 11 to electrical connection between the reading section 14 and the sensor electrodes 12 or vice versa based on a switching control signal $S_5$ acquired from the control unit 20.

In the operation device 1, for example, the driving unit 13, the reading section 14, the switching section 15 and the control unit 20 may be formed on one chip. Alternatively, the operation device 1 may be configured that the driving unit 13, the reading section 14 and the switching section 15 serve as, e.g., a part of the control unit 20.

Configuration of Control Unit 20

The control unit 20 is, e.g., a microcomputer composed of a CPU (Central Processing Unit) performing calculation and processing, etc., of the acquired data, etc., according to a stored program, a RAM (Random Access Memory) and a ROM (Read Only Memory) which are semiconductor memories. The ROM stores, e.g., a program for operation of the control unit 20. The RAM is used as, e.g., a storage area for temporarily storing calculation results, etc. In addition, the control unit 20 has, inside thereof, a means for generating clock signals and is operated based on the clock signals.

The control unit 20 has the first threshold 200, the second threshold 201 and an accumulated information 202 in, e.g., the RAM.

The first threshold 200 is used for detection of a finger, i.e., used for determining whether a finger is touching or not. The control unit 20 compares the detection value $S_4$ acquired from the reading section 14 to the first threshold 200 and determines that the finger is detected when the detection value $S_4$ is greater than the first threshold 200.

After determining that the finger is detected, the control unit 20 calculates a detection point of the detected finger based on the detection value $S_4$ which was used for the determination. Then, the control unit 20 produces the operation information $S_6$ including information about the calculated detection point when the finger is detected, or produces the operation information $S_6$ indicating the state in which the finger is not detected. The control unit 20 is configured to output the produced operation information $S_6$ to the electronic device via the communication section 18. In the electronic device, an operated object is, e.g., moved based on the acquired operation information $S_6$. In this regard, the detection point is calculated by, e.g., a weighted average, etc.

The second threshold 201 is to suppress unintentional movement of the detection point of the finger. In detail, as shown in FIGS. 2A and 2B, when an operator brings a finger 9 into contact with the operation surface 100 and then terminates the contact, i.e., moves the finger 9 away from the operation surface 100, it is considered that, depending on how to move away the finger 9, the detection point moves from a detection point 90a, which is calculated based on a contact area 90 of the pad of the finger 9 as shown in FIG. 2A, to a detection point 91a, which is calculated based on a contact area 91 of the tip of the finger 9 as shown in FIG. 2B.

Here, in case that an operator performs, e.g., a tracing operation on the operation surface 100 and then moves the finger 9 away from the operation surface 100, the detection value $S_4$ is obtained roughly from two periods: a period from time $t_0$ to time $t_1$ during which mainly the tracing operation is performed; and a period after time $t_1$ during which a contact area with the operation surface 100 decreases as the finger 9 moves away from the operation surface 100, as shown in FIG. 2C.

The pad of the finger 9 is in contact with the operation surface 100 to perform an operation between time $t_0$ to time $t_1$ during which the operator is performing the tracing operation, and the finger 9 then moves away from the operation surface 100, from the pad to the finger tip, after time $t_1$. That is, the contact area moves while decreasing from the contact area 90 of the pad to the contact area 91 of the tip, as shown in FIG. 2B. If the operation device 1 calculates a detection point based on the contact area 90 and the contact area 91, a difference d occurs between the detection point 90a and the detection point 91a, as shown in FIG. 2B.

When an operated object by the operation device 1 moves according to such detection points, the operated object moves by the difference d even though the finger 9 simply moves away from the operation surface 100, i.e., even though movement of the operated object is not desired, resulting in the movement not intended by the operator.

The movement of the operated object which is not intended by the operator causes a decrease in operability. Therefore, the operation device 1 is configured to have the second threshold 201 so that, when the detection value $S_4$ is between the first threshold 200 and the second threshold 201, i.e., between time $t_2$ and time $t_3$ shown in FIG. 2C, for example, the detection point 91a corresponding to the detection value $S_4$ for the contact area 91 (the second detection value) is not used but the detection point 90a corresponding to the detection value $S_4$ for the contact area 90 (the first detection value) is kept as-is and is used as a detection point for the contact area 91 to suppress unintentional movement of the detection point. The first and second detection values are not limited to values which are detected sequentially. The first detection value is the latest detection value which is detected prior to the second detection value and is larger than the second threshold 201.

The second threshold 201 may be determined by, e.g., experiments or may be a numerical value obtained by multiplying an expected maximum value of sensitivity by a multiplier.

The accumulated information 202 is an accumulation of information of detection point in each cycle of reading out the capacitance $S_3$. When the detection value $S_4$ is between the first threshold 200 and the second threshold 201, the control unit 20 refers to the accumulated information 202 and acquires information about what should be a detection point.

Figure 3:
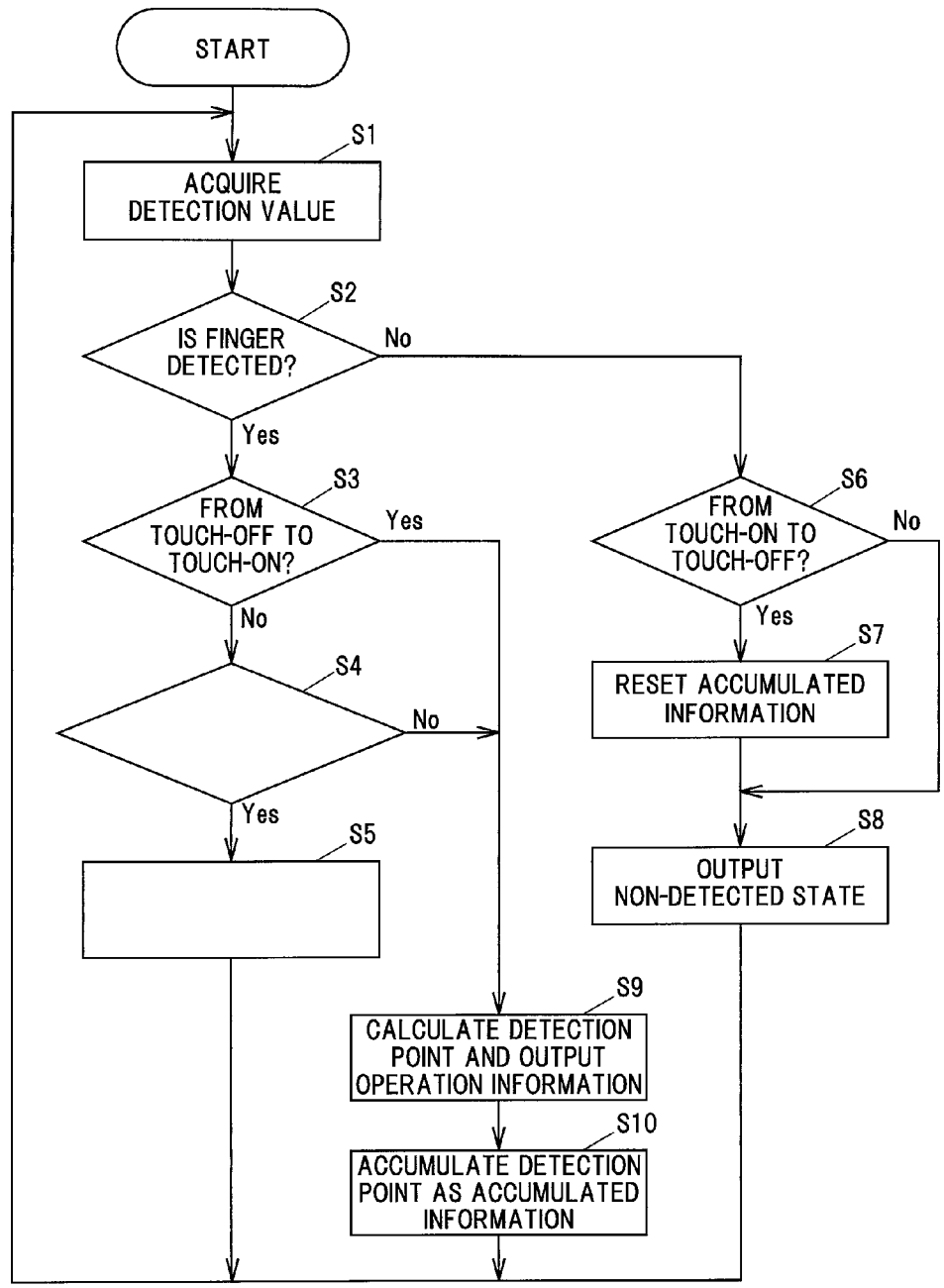
FIG. 3 is a flowchart showing an operation of the operation device in the first embodiment.

An operation of the operation device 1 in the first embodiment will be described below in accordance with the flowchart of FIG. 3.

Operation

When the vehicle 5 is powered on, the control unit 20 of the operation device 1 generates the drive control signal $S_1$ and the switching control signal $S_5$ based on the clock signal and outputs the drive control signal $S_1$ to the driving unit 13 and the switching control signal $S_5$ to the switching section 15.

The driving unit 13 generates the drive signal $S_2$ based on the drive control signal $S_1$ and supplies the drive signal $S_2$ to the sensor electrodes 11 switched over by the switching section 15.

The reading section 14, which is electrically connected to the sensor electrodes 12 to be switched over by the switching section 15 based on the switching control signal $S_5$, produces the detection value $S_4$ by reading out the capacitance $S_3$ from the sensor electrodes 12 connected thereto and outputs the detection value $S_4$ to the control unit 20.

The control unit 20 acquires the detection value $S_4$ (S1), then compares the first threshold 200 to the detection value $S_4$ and determines whether or not the finger is detected.

Once it is determined as a result of comparison that the finger is detected (S2), the control unit 20 then refers to the accumulated information 202 and determines whether or not the finger has been detected in the previous cycle, i.e., whether the event in the previous cycle is touch-on or touch-off. When the event in the previous cycle is touch-on (S3: No), the control unit 20 determines whether or not the detection value $S_4$ in the current cycle is between the first threshold 200 and the second threshold 201.

When the detection value $S_4$ is between the first threshold 200 and the second threshold 201 (S4: Yes), the control unit 20 refers to the accumulated information 202, produces the operation information $S_6$ including the detection point calculated in the previous cycle as a detection point of the current cycle and outputs the operation information $S_6$ to the electronic device via the communication section 18 (S5), and returns the process to Step 1 to read out the detection value $S_4$ in the next cycle. The previous cycle here means a cycle in which a detection value larger than the second threshold 201 is obtained. Therefore, the detection point calculated in the previous cycle means a detection point calculated from the latest value among the detection values which are larger than the second threshold 201.

Here, when it is determined in Step 2 as a result of comparison that the finger is not detected (S2: No), the control unit 20 refers to the accumulated information 202 and determines whether or not the change is from touch-on to touch-off. When the change is from touch-on to touch-off, i.e., when the finger has been detected in the previous cycle (S6: Yes), the control unit 20 resets the accumulated information 202 (S7) and generates and then outputs the operation information $S_6$ indicating that the finger is not detected, i.e., the non-detected state (S8). When the change is from touch-off to touch-on in Step 6, i.e., when the finger has not been detected in the previous cycle (S6: No), the control unit 20 moves the process to Step 8.

Meanwhile, when it is determined in Step 3 that the change is from touch-off to touch-on (S3: Yes), a detection point at which the finger is detected is calculated, the operation information $S_6$ is then generated and output to the electronic device via the communication section 18 (S9) and the detection point is accumulated as the accumulated information 202 (S10).

Then, when it is determined in Step 4 that the detection value $S_4$ is not between the first threshold 200 and the second threshold 201 (S4: No), the control unit 20 moves the process to Step 9.

This series of processes is continuously performed until, e.g., the vehicle 5 is powered off.

Effects of the First Embodiment

The operation device 1 in the first embodiment can suppress unintentional movement, etc., of the operated object and thus can improve operability.

In detail, when the obtained second detection value is between the first threshold 200 and the second threshold 201, the operation device 1 cancels movement from the previously-calculated detection point based on the first detection value. Therefore, as compared to the case where the detection point is calculated based on a threshold for determining whether or not an operation is performed, unintentional movement of an operated object which is not intended by the operator is suppressed and it is thus possible to improve operability.

In addition, since the operation device 1 does not require complicated calculation such as calculating a detection point in each cycle and then performing correction thereon depending on the operation to prevent the detection point from moving, a microcomputer with low processing capacity can be used and the manufacturing cost is thus reduced.

Second Embodiment

The second embodiment is different from the first embodiment in that the second threshold 201 is changed according to the detection value $S_4$.

Figure 4A:
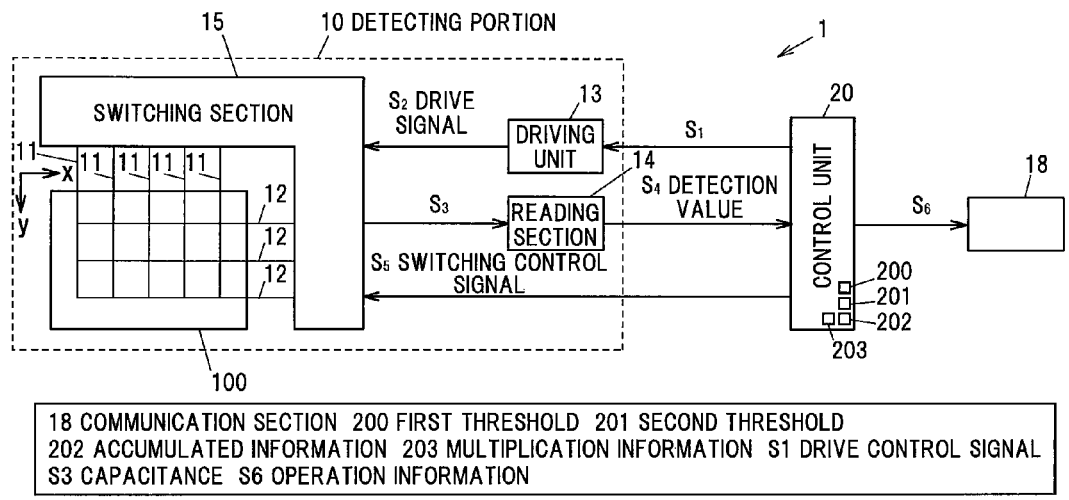
FIG. 4A is a block diagram illustrating an operation device in a second embodiment.
Figure 4B:
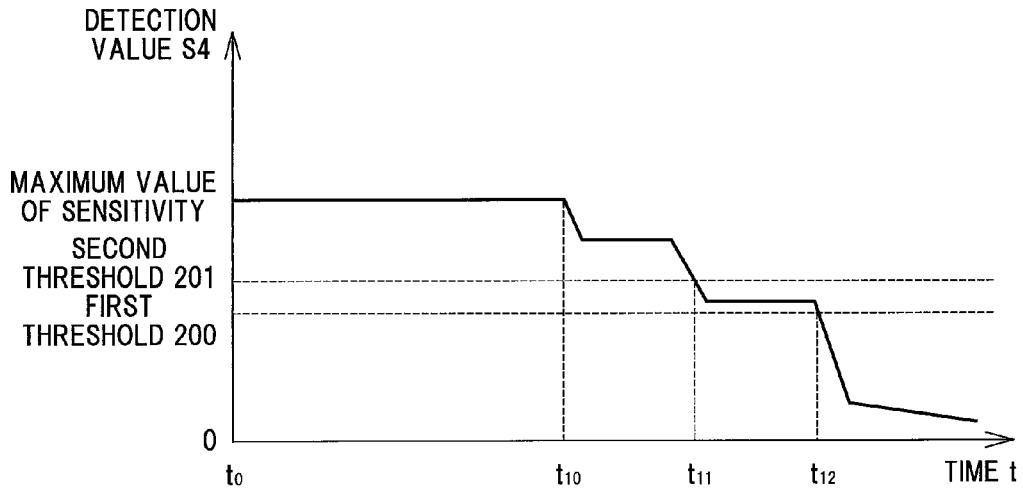
FIG. 4B is a graph showing variation in detection value over time in the second embodiment.

FIG. 4A is a block diagram illustrating the operation device in the second embodiment and FIG. 4B is a graph showing variation in detection value over time. In the second embodiment, portions having the same functions and configurations as the first embodiment are denoted by the same reference numerals as the first embodiment and the explanation thereof will be omitted.

The control unit 20 of the operation device 1 in the second embodiment further includes a multiplication information 203, as shown in FIG. 4A. The multiplication information 203 is configured to include a multiplier for generating the second threshold 201.

In addition, the control unit 20 is configured to set the second threshold 201 by multiplying the maximum value of the acquired detection values $S_4$ by a predetermined multiplier.

In detail, the control unit 20 accumulates the maximum value of sensitivity, which is the maximum value among the acquired detection values $S_4$, in the accumulated information 202 and compares each acquired detection value $S_4$ to the maximum value of sensitivity accumulated in the accumulated information 202. When the comparison result is that the acquired detection value $S_4$ is larger than the maximum value of sensitivity in the accumulated information 202, the control unit 20 updates the maximum value of sensitivity. The control unit 20 multiplies this maximum value of sensitivity by a multiplier, thereby setting the second threshold 201.

The multiplier is preferably, e.g., 0.4 to 0.8, more preferably, 0.5 to 0.7. In the second embodiment, the multiplier is 0.6 as an example.

Here, the second threshold 201 may be set to a value determined based on experiments, etc., when, for example, the maximum value of sensitivity is sufficiently larger than the first threshold 200 as shown in FIG. 2C. However, when the maximum value of sensitivity is not large as shown in FIG. 4B, there is a possibility that the maximum value of sensitivity cannot exceed the pre-set second threshold 201 and remains between the first threshold 200 and the second threshold 201, resulting in that the detection point does not move.

This is considered to happen when, e.g., an operator is wearing gloves or a hand is dry and the maximum value of sensitivity becomes smaller than that of bare hands.

Therefore, the second threshold 201 is not a fixed value and is configured as a variable threshold which is calculated based on the maximum value of sensitivity.

In addition, when the detection point is in a period of between the first threshold 200 and the second threshold 201, i.e., between time $t_{11}$ and time $t_{12}$ as shown in FIG. 4B, the detection point in the current cycle is not used and the control unit 20 uses the detection point in the previous cycle as the detection point in the current cycle.

An operation of the operation device 1 in the second embodiment will be described below in accordance with the flowchart of FIG. 5.

Operation

The control unit 20 acquires the detection value $S_4$ (S20), then compares the first threshold 200 to the detection value $S_4$ and determines whether or not the finger is detected.

Once it is determined as a result of comparison that the finger is detected (S21: Yes), the control unit 20 then refers to the accumulated information 202 and determines whether or not the finger has been detected in the previous cycle, i.e., whether the event in the previous cycle is touch-on or touch-off. When the event in the previous cycle is touch-on (S22: No), the control unit 20 compares the detection value $S_4$ to the maximum value of sensitivity.

When it is determined as a result of comparison that the detection value $S_4$ is not more than the maximum value of sensitivity (S23: Yes), the control unit 20 then determines whether or not the detection value $S_4$ is between the first threshold 200 and the second threshold 201.

When the detection value $S_4$ is between the first threshold 200 and the second threshold 201 (S24: Yes), the control unit 20 refers to the accumulated information 202, produces the operation information $S_6$ including the detection point calculated in the previous cycle as a detection point of the current cycle and outputs the operation information $S_6$ to the electronic device via the communication section 18 (S25), and returns the process to Step 20 to read out the detection value $S_4$ in the next cycle.

Here, when it is determined in Step 21 that the finger is not detected (S21: No), the control unit 20 moves the process to Step 26. Steps 26 to 28 are the same processes as Steps 6 to 8 in the first embodiment.

Meanwhile, when it is determined in Step 22 that the change is from touch-off to touch-on (S22: Yes), the control unit 20 uses the detection value $S_4$ in the current cycle to update the maximum value of sensitivity (S29). Then, the control unit 20 sets the second threshold by multiplying the updated maximum value of sensitivity by a multiplier based on the multiplication information 203 (S30) and moves the process to Step 31.

Steps 31 to 32 are the same processes as Steps 9 to 10 in the first embodiment.

Meanwhile, when it is determined in Step 23 that the detection value $S_4$ is larger than the maximum value of sensitivity (S23: No), the control unit 20 uses the detection value $S_4$ in the current cycle to update the maximum value of sensitivity (S29).

Then, when it is determined in Step 24 that the detection value $S_4$ is not between the first threshold 200 and the second threshold 201 (S24: No), the control unit 20 moves the process to Step 31.

This series of processes is continuously performed until, e.g., the vehicle 5 is powered off.

Effects of the Second Embodiment

The operation device 1 in the second embodiment changes the second threshold 201 according to the maximum value of the detection value $S_4$. Therefore, as compared to the case where the second threshold is fixed, unintentional operations such as no movement of the detection point are suppressed and this further improves operability.

Alternatively, as a modification of the second embodiment, the control unit 20 may sets the second threshold 201 by multiplying the detection value $S_4$ of the first detected operation by a predetermined multiplier.

In addition, as another modification, the detection value $S_4$ which is obtained by bringing a finger of an operator into contact with the operation surface 100 before starting an operation may be multiplied by a predetermined multiplier to set the second threshold 201.

The operation device 1 in at least one of the embodiments suppresses unintentional movement, etc., of the operated object and thus can improve operability.

Although some embodiments and modifications of the invention have been described above, the embodiments and modifications are merely an example and the invention according to claims is not to be limited thereto. These new embodiments and modifications may be implemented in various other forms, and various omissions, substitutions and changes, etc., can be made without departing from the gist of the invention. In addition, all combinations of the features described in the embodiments and modifications are not necessary to solve the problem of the invention. Further, these embodiments and modifications are included within the scope and gist of the invention and also within the invention described in the claims and the equivalency thereof.

What is claimed is:

1. A touchpad operation device, comprising:
   a touch sensor that detects a touching operation performed on an operation surface and that generates an electrical signal; and
   a computing portion in electrical communication with the output of the touch sensor that includes a reading section that converts the electrical signal generated by the touch sensor into a detection value, and a control unit that receives the detection value from the reading section, and functions to
   determine whether or not the touching operation has commenced on the operation surface;
   periodically calculate a detection point within a touching contact area on the operation surface after the touching operation commences,
   periodically compare the detection value generated by the touch sensor with a first threshold and a second threshold which is more than the first threshold, and
   when the detection value acquired from the touch sensor falls between the first and second thresholds, and a subsequent detection value indicates that the touching operation has ended, revert back to the detection point calculated immediately before the detection value fell between the first and second thresholds so as to suppress movement of the detection point when the touching operation ends by effectively cancelling the last detection point.

2. The operation device according to claim 1, wherein the computing portion sets the second threshold by multiplying a maximum value among the acquired detection values by a predetermined multiplier.

3. The operation device according to claim 1, wherein the computing portion sets the second threshold by multiplying the detection value of a first detected operation by a predetermined multiplier.

4. The operation device according to claim 1, wherein the computing portion operates so as to output the detection point calculated based on the second detection value when the touch operation is detected by the detecting portion and the second detection value is not the value between the first and second thresholds.

5. A method of operating a touchpad device that includes a touch sensor that detects a touching operation performed on an operation surface and that generates an electrical signal that indicates a detection value, and a computing portion in electrical communication with the output of the touch sensor that determines whether or not the touching operation has commenced on the operation surface, wherein the computing portion
   periodically calculates a detection point within a touching contact area on the operation surface after the touching operation commences,
   periodically compares the detection value generated by the touch sensor with a first threshold and a second threshold which is more than the first threshold, and
   when the detection value acquired from the touch sensor falls between the first and second thresholds, and a subsequent detection value indicates that the touching operation has ended, reverts back to the detection point calculated immediately before the detection value fell between the first and second thresholds so as to suppress movement of the detection point when the touching operation ends by effectively cancelling the last detection point.

6. The method of operating a touchpad according to claim 5, wherein the second threshold is computed by multiplying a maximum value among acquired detection values by a predetermined multiplier.

7. The method of operating a touchpad according to claim 5, wherein the second threshold is computed by multiplying the detection value of a first detected operation by a predetermined multiplier.

8. The method of operating a touchpad according to claim 5, wherein the computing portion operates so as to output the detection point calculated based on the second detection value when the touch operation is detected by the detecting portion and the second detection value is not the value between the first and second thresholds.

* * * * *